(12) United States Patent
Lemoine et al.

(10) Patent No.: US 8,855,035 B2
(45) Date of Patent: Oct. 7, 2014

(54) ACCESS CONTROL FOR A SERVICE SUBSCRIPTION

(75) Inventors: Benoît Lemoine, Ploubezre (FR); Houmed Ibrahim, Lannion (FR)

(73) Assignee: Orange, Paris (FR)

( * ) Notice: Subject to any disclaimer, the term of this patent is extended or adjusted under 35 U.S.C. 154(b) by 168 days.

(21) Appl. No.: 13/511,417

(22) PCT Filed: Nov. 19, 2010

(86) PCT No.: PCT/FR2010/052456
§ 371 (c)(1),
(2), (4) Date: May 23, 2012

(87) PCT Pub. No.: WO2011/067495
PCT Pub. Date: Jun. 9, 2011

(65) Prior Publication Data
US 2012/0287832 A1    Nov. 15, 2012

(30) Foreign Application Priority Data

Nov. 24, 2009   (FR) .................................. 09 58316

(51) Int. Cl.
*G08C 17/00* (2006.01)
*H04L 12/911* (2013.01)
*H04L 12/18* (2006.01)

(52) U.S. Cl.
CPC .......... *H04L 12/1886* (2013.01); *H04L 47/745* (2013.01); *H04L 12/185* (2013.01)
USPC ....................................................... 370/311

(58) Field of Classification Search
USPC ....................................................... 370/311
See application file for complete search history.

(56) References Cited

U.S. PATENT DOCUMENTS

| | | | |
|---|---|---|---|
| 5,982,748 A | 11/1999 | Yin et al. | |
| 6,738,348 B1 * | 5/2004 | Rollins | 370/230 |
| 7,181,211 B1 * | 2/2007 | Phan-Anh | 455/432.1 |
| 7,643,506 B2 * | 1/2010 | Cantenot et al. | 370/432 |
| 2007/0263625 A1 * | 11/2007 | Engstrand | 370/390 |
| 2008/0112324 A1 | 5/2008 | Li et al. | |
| 2008/0276006 A1 * | 11/2008 | Choi | 709/245 |

(Continued)

FOREIGN PATENT DOCUMENTS

| | | |
|---|---|---|
| CA | 2 276 681 A1 | 12/2000 |
| EP | 1 892 881 A1 | 2/2008 |
| EP | 2 053 804 A2 | 4/2009 |
| WO | WO 2005/071903 A1 | 8/2005 |

*Primary Examiner* — Asad Nawaz
*Assistant Examiner* — Syed S Ali
(74) *Attorney, Agent, or Firm* — Drinker Biddle & Reath LLP (57) ABSTRACT

A subscription to a service provided in a communication network is managed by a first terminal. The communication network includes a second terminal, and the service includes transmission of digital information. An access is capable of obtaining a maximum rising throughput value allocated to the first terminal and a descending throughput value allocated to the second terminal. On the access of the network, an access request is received for subscribing the second terminal to the service provided by the first terminal. Then, a decision about access to or refusal of subscription of the second terminal is made on the basis of the maximum rising throughput value allocated to the first terminal and on the basis of the descending throughput value allocated to the second terminal. And finally, a response indicating the decision is sent.

12 Claims, 4 Drawing Sheets

(56) References Cited

U.S. PATENT DOCUMENTS

| | | | |
|---|---|---|---|
| 2009/0119699 A1 * | 5/2009 | Crassous et al. | 725/25 |
| 2009/0300673 A1 * | 12/2009 | Bachet et al. | 725/31 |
| 2010/0199321 A1 * | 8/2010 | Fan | 725/112 |

* cited by examiner

ACCESS CONTROL FOR A SERVICE SUBSCRIPTION

CROSS-REFERENCE TO RELATED APPLICATIONS

This application is the U.S. national phase of the International Patent Application No. PCT/FR2010/052456 filed Nov. 19, 2010, which claims the benefit of French Application No. 09 58316 filed Nov. 24, 2009, the entire content of which is incorporated herein by reference.

FIELD

The present invention relates to admission control in a communication network, and more particularly to admission control relating to a subscription to a service, which may in particular be a multibroadcast service (or 'multicast').

BACKGROUND

Control of admission to a communication network makes it possible to decide to accept or to deny a request to use resources of the network, as a function of certain criteria. It may in particular allow effective use of the resources of the network, in particular by denying a request to use resources which would be liable to bring about congestion of the network.

It is beneficial to put such admission control in place in communication networks of IP (for 'Internet Protocol') type. Networks of this type make it possible to offer various services such as telephonic services (VoIP for 'Voice over IP'), video telephony (V2oIP for 'Voice and Video Internet Protocol') or else video broadcasting (IPTV for 'Internet Protocol TeleVision').

In such IP networks, it is possible to perform transmissions of packets according to a point-to-point link, termed a unicast IP link, or else according to a point-to-multipoint link, termed a multicast IP link or multibroadcast link. According to the latter type of link, the multicast IP packets are conveyed over the IP network and are replicated from a location relatively close to the recipient multicast terminals. This mode of transport makes it possible to establish unidirectional point-to-multipoint connectivity between an arbitrary unicast IP source address and a plurality of IP terminals, and thus to broadcast packets to these terminals in particular within the framework of a multibroadcast service for digital contents such as video contents for example.

In order to receive a content which is broadcast in the network according to a multicast transmission, a terminal subscribes to a corresponding multicast IP address. Next, subsequent to this subscription, it receives the content through multi-broadcasting.

In certain cases, the interface for access of a terminal thus subscribed to one or more multibroadcast services may be congested. Such congestion may degrade the quality of the multibroadcast service at the level of this terminal.

In order to avoid this type of congestion, document US2008112324 proposes the putting in place of an admission control which decides to accept or to deny a new subscription of a terminal to a multibroadcast service by taking into account the number of multicast IP addresses (or addresses of multibroadcast services) to which it is already subscribed or the total bitrate that this terminal is already receiving. By proceeding in this way, the proposed system makes it possible to limit congestion in the case where it is possible to ascertain an estimate of the bitrate at the level of the access interface for each multicast IP address to which the terminal is already subscribed.

Such may be the case when the source IP address of the multicast transmission corresponds to a server implemented by a content provider or else by a network operator. Indeed, in this case it is possible to control the bitrate generated by the server.

However, this type of admission control does not make it possible to effectively avoid congestion on the access interface in the case where an arbitrary terminal of the network may itself become a source of multibroadcast service to which other terminals of the network may subscribe.

Indeed, under these conditions, it is not possible to estimate the bitrate generated by a source terminal of a multibroadcast service and that a subscriber might receive during the period of his subscription to this multibroadcast service.

SUMMARY

The present invention improves the situation.

A first aspect of the present invention proposes a method of managing subscription to a service offered in a communication network by a first terminal; said communication network comprising a second terminal and said service comprising a transmission of digital information;
in which an admission entity of the network previously obtains a maximum value of upload bitrate and a value of download bitrate respectively allocated to the first and second terminals;
said method comprising the following steps at the level of the admission entity of the network:

/1/ receiving an admission request in respect of a subscription of the second terminal to the service offered by the first terminal;

/2/ taking a decision regarding admission or denial of subscription of the second terminal on the basis of the maximum value of upload bitrate allocated to the first terminal and of the value of download bitrate allocated to the second terminal; and /3/ emitting a response indicating said decision.

The term 'communication network' is intended to mean any type of network such as for example wireless, mobile, or else fixed communication networks. This network may in particular be an IP network according to the Internet protocol.

The term 'terminal' is intended to mean any type of terminal suitable for communicating in the communication network considered, such as a fixed telephone, a mobile telephone, a computer, etc.

The term 'maximum value of upload bitrate allocated to a terminal' is intended to mean the bitrate value that a terminal is not permitted to exceed for the outgoing streams that it emits to the communication network.

The term 'digital information' is intended to mean any information suitable for being transported in the communication network according to a suitable transmission protocol. This digital information may in particular correspond to documents, digital contents of video or audio types, images, etc.

In the network considered, it is possible to allocate maximum values of upload bitrate to various terminals. This allocation of maximum value makes it possible to limit the total stream bitrate emitted by a terminal on the communication network considered. Furthermore, in one embodiment of the present invention, values of download bitrate can moreover be allocated to some of the terminals of the network. The term 'value of download bitrate allocated to a terminal' is intended to mean the bitrate value that it is possible to guarantee in reception for a terminal from the communication network. Thus, it is possible that under certain conditions the terminal may receive a higher download bitrate but this bitrate is not guaranteed if its value is greater than the allocated value of download bitrate.

Under these conditions, provision is made to decide whether or not to admit an admission request in respect of a subscription for a determined terminal by taking into account at one and the same time:
- the maximum value of upload bitrate allocated to the first terminal, that is to say to the terminal which offers the service considered; and
- the value of download bitrate allocated to the second terminal.

By proceeding in this way, it is advantageously possible to forestall a state of congestion on the network access interface. Indeed, in this context, the first terminal is the terminal which offers the service considered. A maximum value of upload bitrate is allocated to this first terminal. Thus, in this network the first terminal is limited to this maximum value in its outgoing bitrate to the network.

Consequently, whatever the service that this first terminal is able to provide, in no case will it be able to represent a data stream bitrate greater than this maximum value. It is appropriate to consider that in reception, a terminal subscribed to this service will not therefore receive, in the context of this service, a bitrate greater than the maximum upload bitrate that is permitted to the first terminal.

By considering these two bitrate values, it is easy to forestall, in a relevant way, congestion in respect of any new subscription to a service offered in the network by one of the terminals of the network.

These provisions can easily be applied to any type of service offered to one or more terminals by another terminal of the network. They are particularly advantageous in the context of a multibroadcast service offered in the network by a terminal. Indeed, it is all the more advantageous to take care to avoid congestion in the context of a multibroadcast service which is by nature more liable to bring about congestion on the network access interface. However, no limitation is attached to the type of service offered in the network. The present invention covers any type of service which comprises a step of transmitting digital information from one terminal to another terminal of a communication network, this transmission possibly being based on a point-to-point link or else on a point-to-multipoint link.

In one embodiment of the present invention, at least one other service is offered in the network by at least one other terminal to which a maximum value of upload bitrate is allocated. The second terminal is already subscribed to this other service. The maximum value of upload bitrate allocated to this other terminal is stored as service bitrate value associated with the second terminal. In this context, provision may be made to perform step /2/ on the basis furthermore of the service bitrate value.

Next, if the requested subscription is admitted in this step /2/, then the maximum value of upload bitrate allocated to the first terminal is added to the service bitrate value associated with the second terminal.

Stated otherwise, here, the decision-taking relating to the admission of the requested subscription to the service takes into account another bitrate value which corresponds to the sum of bitrate values, if any, corresponding to the services, if any, to which the terminal concerned is already subscribed. Consequently, this decision-taking may be finer and can allow better anticipation of forthcoming congestion on the communication network access interfaces. On admission of the requested subscription, the service bitrate value associated with the second terminal is updated by adding thereto the maximum value of upload bitrate allocated to the first terminal, that is to say to the new subscription which has just been admitted.

The service bitrate value associated with the second terminal therefore in fact represents the sum of the maximum values of upload bitrates respectively allocated to the terminals offering the services to which the second terminal is subscribed.

In one embodiment of the present invention, the method of managing subscription furthermore comprises the following steps:
/a/ receiving an information item relating to an unsubscription of the second terminal from the service offered by the first terminal;
/b/ updating the service bitrate value associated with the second terminal by subtracting the maximum value of upload bitrate allocated to the first terminal;
/c/ acknowledging receipt of this information item relating to the unsubscription.

By virtue of these provisions, when the second terminal subscribed to the service offered by the first terminal unsubscribes, the service bitrate value is also updated by subtracting the maximum value of upload bitrate allocated to the terminal offering the service considered. Consequently, the admission decision-taking is taken on the basis of information updated over time and can therefore remain relevant despite certain alterations.

In order to follow the alterations of certain characteristics of the network, provision is also made that, in one embodiment, when the maximum value of upload bitrate allocated to the first terminal is increased, steps /2/ and /3/ are performed again.

It may be relevant to take into account alterations, if any, as regards the maximum values of upload bitrate allocated to the terminals offering services in the communication network. Thus, when a variation in maximum value is detected, the admission decision-taking step is here performed again so as to monitor whether despite this change the admission criteria are still satisfied. If such is not the case, then the subscribed terminal is informed thereof.

These steps may be implemented at the level of an admission entity in charge of taking the decision regarding admission or denial of subscription. Provision may then be made for either the terminal to emit a request for unsubscription from the service on receipt of this new information received from the admission entity, or the admission entity itself requests unsubscription from the service in respect of this terminal.

Whatever the mechanism used here in the case of alteration of the maximum value of upload bitrate allocated to a terminal offering a service, when an unsubscription is decided, it may be advantageous to select, from among the subscriptions admitted, if any, in respect of the second terminal, that one which represents the largest bitrate, that is to say the largest maximum value of upload bitrate.

It is advantageous for provision to be made to store per service offered an information item relating to the terminals subscribed to this service. Thus, when this characteristic alters, it is then possible to perform steps /2/ and /3/ again for each of the terminals subscribed to the service for which this upload bitrate characteristic has altered.

It may also be relevant to make provision to adapt to other alterations. Thus, when the value of download bitrate allocated to the second terminal is reduced, steps /2/ and /3/ can be performed again.

Here also, if this alteration entails the fact that the admission criteria of step /2/ are no longer satisfied, then it may be relevant to trigger an unsubscription from a service for the terminal concerned, as described hereinabove.

In one embodiment, the service offered is a multibroadcast service. A first individual send address and a second multibroadcast address being allocated to the first terminal, and a third individual send address being allocated to the second terminal; the maximum value of upload bitrate allocated to the first terminal is stored in association with the first individual send address and the value of download bitrate allocated to the second terminal is stored in association with the third individual send address; and the admission request indicates the first address relating to the first terminal and the third address relating to the second terminal.

The term 'individual send address' is intended to mean a network address allocated to a terminal which allows the latter to establish a point-to-point communication in the network. The term 'multibroadcast address' is intended to mean an address allocated to a terminal in the network which allows the latter to broadcast to a set of addresses a stream of data in the network. This set of addresses can correspond to a set of terminals which have subscribed to the multibroadcast address considered.

Here, the communication network may for example be a network of IP type, the IP layer allowing subscription of terminals to a multibroadcasting address of another terminal.

By making provision to structure the storage of information in this way, that is to say on the basis of the unicast addresses allocated to the terminals of the network, it is thereafter easy to implement the control of admission parameters according to one embodiment of the present invention.

The architecture of the network considered may be such that the terminals have access to the network via an access entity.

Thus, the second terminal has access to the network via an access entity; and the method comprises the following steps at the level of said access entity:

/i/ receiving a request for subscription of the second terminal to the service offered by the first terminal;

/ii/ transmitting an admission request in respect of this subscription to an admission entity; and /iii/ on receipt of a response indicating the admission of the second terminal to the service, transmitting the digital information received to the second terminal, in which in step /ii/, if said service is not already received, the following steps are performed:

emitting a request for subscription to the service destined for the network;

receiving the digital information.

Thus, in this case, the access entity is in charge of triggering the transmission of the digital information to it as soon as the first of the terminals under its charge requests same.

The method can furthermore comprise the following steps at the level of the access entity:

receiving a request for unsubscription of the second terminal from the service offered by the first terminal;

transmitting an information item relating to an unsubscription to the admission entity; and halting the transmission of the digital information destined for the second terminal, in which, when the second terminal is the last terminal subscribed to the service for the access entity, said access entity transmits the request for unsubscription to the network.

A second aspect of the present invention proposes an admission entity suitable for implementing a method according to the first aspect of the present invention.

A third aspect of the present invention proposes a system for managing subscription comprising an admission entity according to the second aspect of the present invention and comprising an access entity suitable for implementing certain aspects of the management method according to the first aspect of the present invention.

In such a system for managing subscription, the access entity may be suitable for limiting the upload bitrate of the first terminal short of the maximum value of upload bitrate which is allocated to it.

A fourth aspect of the present invention proposes an item of global network switching equipment suitable for implementing a method according to the first aspect of the present invention.

A fifth aspect of the present invention proposes a computer program comprising instructions for the implementation of the method according to the first aspect of the present invention, when this program is executed by a processor.

A sixth aspect of the present invention proposes a recording medium on which the computer program according to the fifth aspect of the present invention is stored.

BRIEF DESCRIPTION OF THE DRAWINGS

Other aspects, aims and advantages of the invention will become apparent on reading the description of one of its embodiments.

The invention will also be better understood with the aid of the drawings, in which.

DETAILED DESCRIPTION

Figure 1:
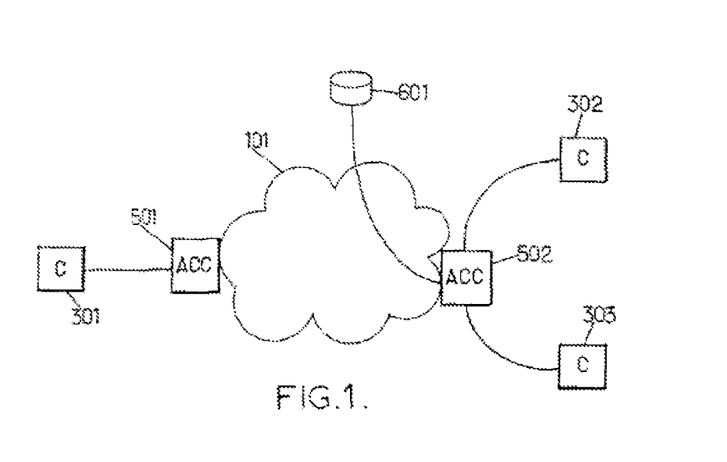
FIG. 1 illustrates an architecture of a communication system according to one embodiment of the present invention.

FIG. 1 illustrates an architecture of a communication system according to one embodiment of the present invention.

Such a communication system comprises a communication network 101 which is accessible to a first terminal 301 via an access entity 501 and to second and third terminals 302 and 303 via an access entity 502. This system furthermore comprises an admission entity 601 which is in charge of deciding to accept or to deny a subscription request of a terminal according to one embodiment of the present invention.

In this network, the terminal 301 is suitable for offering a service to which other terminals of the network, such as for example the terminal 302 and/or the terminal 303, can subscribe.

The maximum values of upload bitrate allocated respectively to the terminals 301, 302 and 303 are denoted $D_{up1}$, $D_{up2}$ and $D_{up3}$.

The values of download bitrate allocated respectively to the terminals 301, 302 and 303 are denoted $D_{down1}$, $D_{down2}$ and $D_{down3}$. The download bitrate value $D_{down}$ corresponds to a guaranteed value of download bitrate.

In this embodiment, these access entities 501 and 502 are distinct and are suitable for managing the transfer of the multicast packet streams through the network according to a transmission protocol. No limitation is attached to the protocol used between these access entities.

If the access entities 501 and 502 are IP routers, the multicast protocol used can for example be one of the variants of the protocol of PIM type (for 'Protocol Independent Multicast'), for example PIM-SM (for 'Protocol Independent Multicast Sparse Mode'), described in RFC 4601. If the access entities 501 and 502 are nodes relaying the IP packets without routing them, the multicast protocol used can then be for example a protocol of the IGMP type (for 'Internet Group Management Protocol') for IPv4 (for IP version 4) or MLD (for "Multicast Listener Discovery") for IPv6 (for IP version 6).

Figure 2:
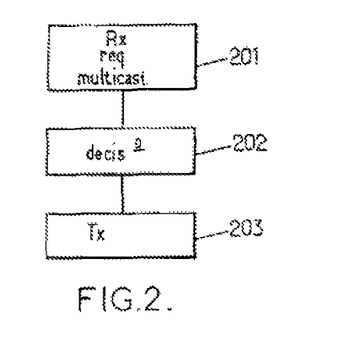
FIG. 2 illustrates the main steps of a method for managing a service according to one embodiment of the present invention.

FIG. 2 illustrates the main steps of a method of admission of subscription to a service according to one embodiment of the present invention.

In a step 201, a request for subscription of the second terminal to the service offered by the first terminal is received.

In a step 202, a decision is made to admit or to deny this subscription of the second terminal on the basis of the maximum value of upload bitrate allocated to the first terminal $D_{up}$ and of the value of download bitrate allocated to the second terminal $D_{down}$.

Next, in a step 203, a response indicating the decision taken in step 202 is emitted.

Even if no limitation is attached to the type of service considered, in the following sections the service offered in the network is a multicast service or multibroadcast service. Generally, the terms 'multibroadcast' and 'multicast' are employed here in a similar manner.

Figure 3:
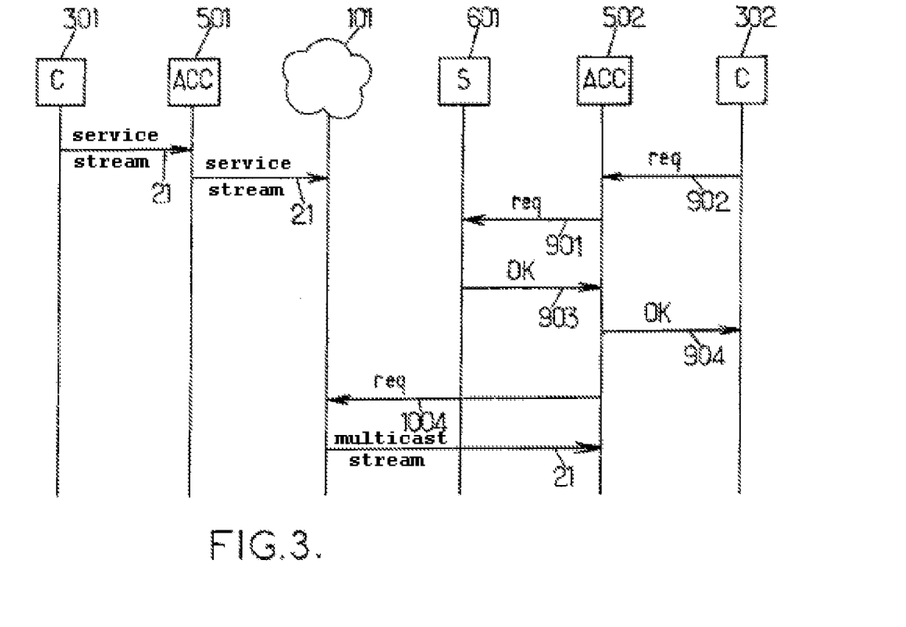
FIG. 3 illustrates an exemplary implementation of the method of managing subscription to a service according to one embodiment of the present invention in a system such as illustrated in FIG. 1.

FIG. 3 illustrates an exemplary implementation of the method of managing subscription to a service according to one embodiment of the present invention in a system such as illustrated in FIG. 1.

The communication network 101 may be a network of IP type in which the terminals can establish links of various types between themselves, and in particular point-to-point (or 'unicast') links and point-to-multipoint (or 'multicast' or 'multibroadcast') links. By using the multicast links, it is easy to offer in the network multibroadcast services such as for example a video broadcasting service to subscribed terminals.

The communication network 101 makes it possible to establish a multicast link on the basis of a multicast IP address.

Hereinafter, the unicast addresses or individual send addresses are denoted $@_{uni}$ and the multicast addresses or multibroadcast addresses are denoted $@_{multi}$.

It is possible to provide for a first terminal 301 to offer a multibroadcast service to other terminals of the network. In this case, a unicast source IP address $@_{uni1}$ and a multicast IP address $@_{multi1}$ are allocated to the terminal 301. Next, in order to be subscribed to this service, a terminal subscribes in respect of the multibroadcast address of the terminal.

To the other terminals 302 and 303 are allocated the respective unicast IP addresses $@_{uni2}$ and $@_{uni3}$.

In the example illustrated in FIG. 1, the access entity 501 is in charge of managing access to the network of the terminal 301, and in particular in this regard it is in charge of limiting the upload bitrate short of a maximum bitrate value $D_{up1}$ and of guaranteeing the download bitrate of the terminal 301 as far as a value of download bitrate allocated to this terminal $D_{down1}$. The access entity 502 manages the network access of the terminals 302 and 303, and in this regard limits the upload bitrate short of a maximum bitrate value $D_{up2}$, $D_{up3}$ and guarantees the download bitrate as far as a value of download bitrate allocated both in respect of the terminal 302 $D_{up2}$ and in respect of the terminal 303 $D_{up3}$.

Thus, the terminal 301 is availed of a unicast address $@_{uni1}$ and of a multicast address $@_{multi1}$ which allows it to offer a multibroadcast service.

In one embodiment of the present invention, provision is made to take a decision regarding admission of a subscription of a terminal to the service offered by the terminal 301 on the basis on the one hand of the maximum value of upload bitrate allocated to the terminal 301 and on the other hand of the value of download bitrate allocated to the terminal which wishes to subscribe. By comparing these two values it is possible to avoid, in a relevant manner, congestions of the network access link. It is in particular possible to deny a request for subscription to a service of a terminal to which is allocated a lower value of download bitrate than the maximum value of upload bitrate of the terminal which is the one which is offering the service.

In one embodiment, provision is made to take the decision to accept or to deny the subscription to a service by furthermore taking into account one or more subscriptions to services previously accepted in respect of the terminal which is currently requesting a new subscription. In this case, it is advantageously possible to take a subscription admission or denial decision in a way which is still more suited to certain conditions.

In the following sections, the previously accepted subscriptions are taken into account.

For this purpose, the respective values of service bitrate already permitted respectively for the terminals 302 and 303 are denoted $D_{serv2}$ and $D_{serv3}$. More precisely, for a given terminal, the service bitrate value corresponds to the sum of the maximum values of bitrate of each service to which the terminal considered is already subscribed. Thus, in the case illustrated, if the terminal 302 is already subscribed to a service offered by the terminal 303 for example, the service bitrate value $D_{serv2}$ associated with the terminal 302 can indicate a bitrate value representing this service. Provision may in particular be made in this case for the service bitrate value $D_{serv2}$ to represent the maximum value of upload bitrate allocated to the terminal 303.

Thus, in this embodiment, the decision to accept the subscription to the service of the terminal 301 will be performed by advantageously taking into account the services to which the terminal requesting a new subscription is already subscribed.

No limitation is attached to the type of service bitrate $D_{serv}$ already permitted for a given terminal. Indeed, the value of this service bitrate can correspond to any type of service that the terminal considered is apt to receive, whether these services are offered by a server or else by an actual terminal of the network.

The subscription admission decision may be taken at the level of any network entity which is suitable for receiving a message indicating a subscription request of a terminal and for deciding to admit it or not as a function of admission parameters relating to the various bitrates such as those stated hereinabove. This network entity is suitable for storing, or at the very least recovering, the bitrate information on the basis of which it decides to admit or to deny the requested subscription, according to one embodiment of the present invention. Indeed, the bitrate information may be stored in a database to which the admission entity has access.

The subscription admission decision may be taken at the level of an admission entity 601. In this case, provision may be made for the admission entity to obtain and store the following information in association with each terminal of the network for which it is in charge of managing admission to the network:

a maximum value of upload bitrate $D_{up}$;
an allocated value of download bitrate $D_{down}$; and
an already allocated value of service bitrate $D_{serv}$.

The information regarding allocated maximum value of upload bitrate and allocated value of download bitrate is for example obtained from an access nodes control facility, not represented.

No limitation is attached to the storage of this information in association with a terminal of the network.

Provision may in particular be made for this information to be stored in association with a unicast address $@_{uni}$ of the terminal considered.

In the architecture illustrated in FIG. 1, the messages emitted and received by a terminal travel through an access entity. Thus, the service subscription requests emitted by a terminal travel through the access entity which is in charge of managing this terminal's network access. However no limitation is attached to this aspect. Indeed, whatever the architecture considered, it suffices that the terminals can emit requests destined for the admission entity.

FIG. 3 illustrates the various exchanges of messages implemented according to one embodiment of the present invention.

The terminal 301 is suitable for offering a multibroadcast service in the course of which it transmits from its source IP address $@_{uni1}$ to terminals which are subscribed to its multicast IP address $@_{multi1}$ a service stream 21 via the access entity 501 and the network 101.

Here, when the terminal 302 wishes to receive the content multi-broadcasted by the terminal 301, it subscribes by emitting destined for the access entity 502 a request 901 for subscription to the service multibroadcasted from the multicast IP address $@_{multi1}$. The subscription request 901 furthermore comprises the unicast IP address $@_{uni1}$ of the terminal 301. Such a service can correspond to a service stream originating from the unicast IP address $@_{uni1}$ of the terminal 301.

Next, the access entity 502 sends an admission request 902 to the admission entity 601 to ask to it to decide to accept or to deny the subscription requested by the terminal 302.

The admission request 902 indicates on the one hand the unicast IP address $@_{uni1}$ of the multibroadcast source of the terminal 301 and on the other hand the unicast IP address $@_{uni2}$ of the terminal 302 corresponding to the subscription request 901.

On receipt of this admission request 902, the admission entity 601 performs an admission control according to one embodiment of the present invention.

The admission entity 601 storing the bitrate values as a function of the respective unicast addresses of the terminals, it recovers in memory the maximum value of the upload bitrate $D_{up1}$ of the terminal 301 on the basis of the unicast address $@_{uni1}$ indicated in the admission request 902 and, on the basis of the unicast address $@_{uni2}$ of the terminal 302, indicated in the admission request 902 also, the download bitrate value $D_{down2}$ allocated to the terminal 302 as well as the service bitrate value $D_{serv2}$ already allocated to the terminal 302.

Next, the admission entity 601 adds the maximum value of the upload bitrate $D_{up1}$ allocated to the terminal 301 to the already permitted value of the service bitrate $D_{serv2}$ for the terminal 302. It compares the result of this addition with the download bitrate value $D_{down2}$ allocated to the terminal 302, subsequent to this comparison, it decides whether or not to accept this subscription in respect of the terminal 302.

This comparison step can for example consist in comparing these two values directly, as follows:

$$(D_{up1}+D_{serv2}) < D_{down2}$$

If this inequality is satisfied, the admission entity can accept the subscription and deny it in the converse case.

It is also possible to envisage performing a slightly more complex comparison based for example on the following inequality:

$$(D_{up1}+D_{serv2}D_{sec}) < D_{down2}$$

where $D_{sec}$ is a constant value which is a safety margin making it possible to take into account in a coarse manner other receptions, if any, of data intended for the terminal 302, without however knowing the quantity thereof.

No limitation is attached to the comparison implemented at this level on the basis of these three types of bitrate.

Next, if the subscription is denied, the admission entity 601 returns to the access entity 502 a negative response to its admission request 902 and the access entity 502 returns to the terminal 302 a negative response to its subscription request 901 (not illustrated).

In the case where the subscription is accepted on the basis of a comparison of the bitrate values stated hereinabove, the admission entity 601 updates the service bitrate value associated with the terminal 302 by adding to the previous value the maximum value of upload bitrate of the terminal 301. Next, it returns to the access entity 502 a positive response 903 to its admission request 902. Provision may be made, optionally, for the maximum value of the upload bitrate $D_{up1}$ allocated to the terminal 301 to be indicated in the positive admission response 903. Thus, not only the access entity 502 but also the terminal 302 can be informed thereof.

The access entity 502 thereafter returns to the terminal 302 a positive response 904 to its subscription request 902. This response 904 can indicate the maximum upload bitrate $D_{up1}$ allocated to the terminal 301.

The terminal 302 knowing the maximum upload bitrate $D_{up1}$ allocated to the terminal 301 for the associated service, it can advantageously unsubscribe from this service if it deems that the associated bitrate is too large, in regard to the download bitrate guaranteed on its access interface and of the bitrate associated with the other services to which it has subscribed.

On completion of these exchanges of messages, either the access entity is already receiving the service stream 21, for example because another terminal under its charge is already subscribed to this service, or the access entity is not yet receiving this service stream 21.

In the first case, the access entity is permitted to relay to the terminal 302 the multicast service stream 21 received from the address $@_{uni1}$ of the terminal 301.

In the second case, that is to say when the terminal 302 is the first terminal to be subscribed to the multibroadcast service offered by the terminal 301, the access entity 502 emits to the network 101 a subscription request 1004 in respect of the service offered by the terminal 301. Subsequent to this subscription request, the multibroadcast service stream 21 emitted by the terminal 301 is transmitted up to the access entity 502. These steps are more precisely described in conjunction with FIG. 5.

Figure 4:
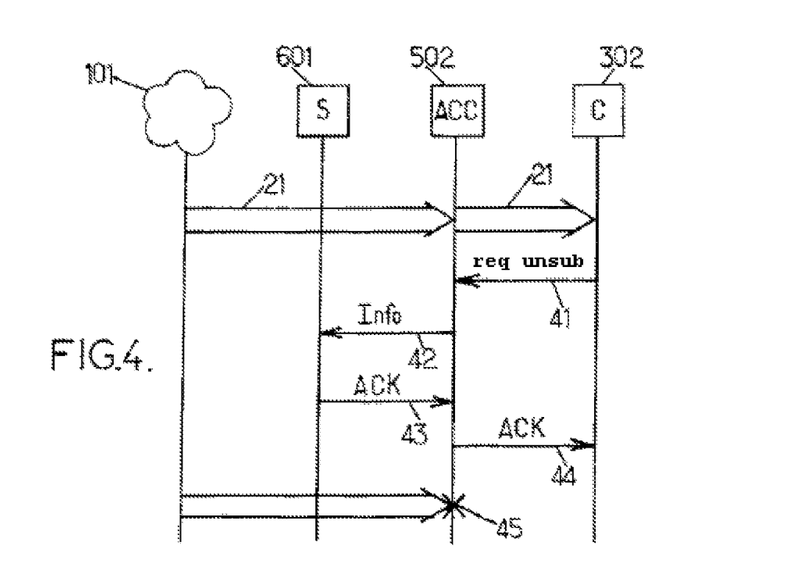
FIG. 4 illustrates a step of unsubscription of a terminal from a multibroadcast service offered by another terminal according to one embodiment of the present invention.

FIG. 4 illustrates an step of unsubscription of the terminal 302 from the multibroadcast service offered by the terminal 301.

When the terminal 302 no longer wishes to be subscribed to the service offered by the terminal 301, that is to say here when it no longer wishes to receive the service stream 21 from the source with address $@_{uni1}$ of the terminal 301, it sends to the access entity 502 an request 41 for unsubscription to the multicast IP address $@_{multi1}$ for the service stream 21 originating from the unicast IP address $@_{uni1}$.

On receipt of this unsubscription request 41, the access entity 502 relays the unsubscription request in the form of an information message 42 to the admission entity 601 so as to inform it of the request for unsubscription of the terminal 302 from the multibroadcast service offered by the terminal 301.

The information message 42 indicates the unicast IP address $@_{uni1}$ of the multicast source of the terminal 301 and the unicast IP address $@_{uni2}$ of the terminal 302 which emitted the unsubscription request 41.

On receipt of the information message 42, the admission entity 601 subtracts the maximum value of the upload bitrate $D_{up1}$ of the terminal 301 from the value of service bitrate $D_{serv2}$ already permitted for the terminal 302.

Next, the admission entity returns to the access entity 502 an acknowledgment response 43 to the information message 42. The access entity 502 returns to the terminal 302 a positive response 44 to its unsubscription request 41 and ceases relaying 45 to the terminal 302 the IP packets of the service stream 21 originating from the terminal 301.

Figure 5:
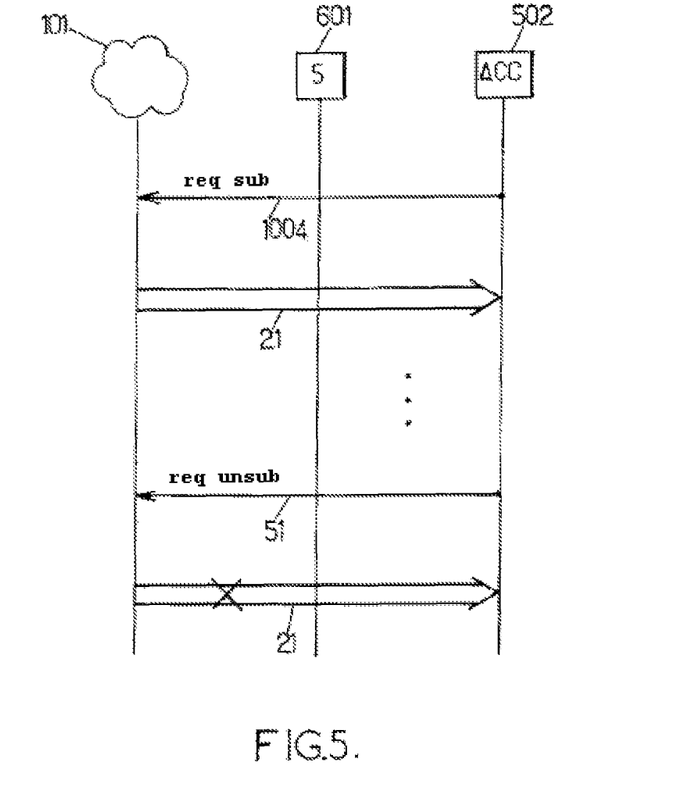
FIG. 5 illustrates steps of subscription of and of unsubscription of an access entity to and from the service according to one embodiment of the present invention.

FIG. 5 illustrates steps of subscription and of unsubscription of an access entity to and from the service according to one embodiment of the present invention.

When, among the terminals under the charge of the access entity 502, the first receives a positive decision regarding acceptance of subscription of the admission entity, this access entity requests reception of the corresponding service stream 21. For this purpose, it emits a subscription request 1004 destined for the multibroadcast network 101. Next, subsequent to this request it receives the service stream 21.

Thereafter, when, among the terminals under the charge of the access entity 502, the last terminal unsubscribes from the service considered, the access entity 502 then emits a service unsubscription request 51 to the network. Next, subsequent to this message, the access entity 502 ceases receiving the service stream 21.

It is possible that the maximum values of upload bitrate allocated to the terminals of the network alter over time. In this case, it may be advantageous to take these alterations into account.

In one embodiment of the present invention, when the maximum value of the upload bitrate allocated to the terminal 301 decreases, the admission entity 601 subtracts from the value of already permitted service bitrate $D_{serv}$ of each terminal of the network whose source IP address $@_{uni}$ has been associated with the source IP address $@_{uni1}$ of the terminal 301 the difference between the previous maximum value of the upload bitrate and the new maximum value of the upload bitrate, allocated to the terminal 301.

It is thus advantageously possible to have an admission control that can alter over time.

In one embodiment of the present invention, the admission entity 601 determines the access entity or the access entities which are in charge of the terminals subscribed to the service offered by the terminal 301. Next, this information is relayed by the corresponding access entities and the subscribed terminals are informed of these changes of maximum value of upload bitrate.

The admission entity 601 can recover their respective addresses $@uni$ which are associated with the address $@_{uni1}$ of the terminal 301.

In one embodiment, when the maximum value of upload bitrate $D_{up1}$ allocated to the terminal 301 increases, the admission entity 601 adds, to the value of already permitted service bitrate $D_{serv}$ for each terminal whose source IP address $@_{uni}$ has been associated with the source IP address $@_{uni1}$ of the terminal 301, the difference between the new maximum value of upload bitrate and the previous maximum value of upload bitrate allocated to the terminal 301.

Thus, at the level of the admission entity, the following equation may be applied:

$$D_{servi}(t+1)=D_{servi}(t)+\Delta(t+1,t)$$

where $D_{servi}(t)$ represents the value of service bitrate as a function of time for a terminal i; and where $\Delta(t+1,t)$ represents the difference between the maximum value of upload bitrate at the instant t+1 and the previous maximum value of upload bitrate at the instant t, allocated to the terminal offering the service considered.

In one embodiment of the present invention, the admission entity 601 sends the new maximum value of upload bitrate allocated to the terminal 301 to the access entity 502 or to the access entities in charge of managing the access of the terminals which are subscribed to the service offered by this terminal 301. The admission entity 601 can recover their respective addresses $@_{uni}$ which are associated with the address $@_{uni1}$ of the terminal 301.

Provision may be made for the access entity 502 or the corresponding access entities to relay this information to all the terminals subscribed to the multicast service stream emitted by the terminal 301.

In order to render this system suited to the various alterations, provision may be made for the admission entity 601 to perform admission controls in the course of time as a function of the alterations over time of the maximum values of upload bitrate allocated to the terminal offering the service.

In this context, provision may in particular be made that, when this maximum value increases, the admission entity monitors for each subscribed terminal whether the admission criteria are still satisfied. Thus, in the case where the following inequality is not satisfied:

$$(D_{up1}+D_{serv2}+D_{sec})<D_{down2}$$

where $D_{up1}$ corresponds to the last value received, then the admission entity can decide to send a request for rejection of subscription to the multicast service offered by the terminal 301 destined for the access entity or corresponding entities in charge of the subscribed terminals and for which the inequality hereinabove is no longer satisfied.

It may be advantageous to wait a period of time determined for example by configuration between the moment when the admission entity is informed of a change and the moment when it informs the subscribed terminals thereof, so as to avoid an instability related to too many modifications of this type in the network.

The access entity 502 can thereafter relay it to all the terminals subscribed to the service concerned.

In one embodiment of the present invention, when the value of download bitrate $D_{down2}$ allocated to a subscribed terminal, for example to the terminal 302, decreases and becomes less than the already permitted value of multicast service bitrate $D_{serv2}$, the admission entity 601 sends to the access entity 502 in charge of this terminal 302, a request for rejection of subscription to the multicast service offered.

It may be advantageous to wait a period of time determined for example by configuration between the moment when the admission entity is informed of a change and the moment when it informs the subscribed terminals thereof, so as to avoid an instability related to too many modifications of this type in the network.

The access entity 502 can thereafter relay this information to the terminals concerned subscribed to the multicast service of the terminal 301.

It is possible that the terminal 302 may already be subscribed to one or more other services. In this case, it may happen that despite the unsubscription from the service offered by the terminal 301, the service bitrate value allocated to the terminal 302 is still greater than the download bitrate value allocated to it. Provision may then be made that, if this situation endures after a waiting time defined by default, and that may be configured for example, then the admission entity 601 sends the access entity 502 a request for rejection of subscription to the multicast service offered by this other terminal.

Next, the access entity 502 can relay this information to the terminal concerned 302.

In the case where, for a terminal subscribed to several multicast services, the service bitrate value is greater than the value of download bitrate, the admission entity 601 can advantageously choose, from among the catalogued services to which the terminal considered is subscribed, the one offered by the terminal having the largest allocated upload bitrate value.

Whatever the protocol used by access entities 501 and 502 to control the transfer of the multicast service stream 21 from one to the other, the following steps may be implemented.

As long as the access entity 502 does not receive any positive response to the first emitted subscription request in respect of a terminal under its charge in relation to the service offered by the terminal 301, it does not relay to the network 101 the request 901 for subscription to the multicast IP address $@_{uni1}$ in respect of the packets originating from the unicast IP address $@_{multi1}$.

When the access entity 502 receives the first positive response to a subscription admission request in respect of a terminal under its charge, it relays to the network 101 according to a suitable multicast protocol the subscription request so that the network 101 sends the service stream 21 emitted by the terminal 301 to the multicast address $@_{multi1}$.

The access entity 502 does not relay the request for unsubscription to the multicast IP address $@_{multi}$ in respect of the packets originating from the unicast IP address, except after it has received the last positive response to its request for information in respect of the subscribed terminals under its charge.

Then, the access entity 502 relays to the transport network 101 the request so that the network 101 ceases relaying to it the multicast packets of the service stream 21 emitted by the terminal 301 to the multicast address $@_{multi1}$.

In the case of a non-multibroadcast service, provision may be made for the subscription request emitted by the receiver terminal 302 to indicate the unicast IP address $@_{uni1}$ of the terminal 301 offering a point-to-point service.

In one embodiment of the present invention, the method differs from the case of a multibroadcast service in respect of the following cases:

when the admission entity 601 accepts the subscription to this service, and as long as the subscription to this service is effective, the access entity 502 records the unicast IP address $@_{uni1}$ of the terminal 301 so as to relay to the terminal 302 all the packets originating from the terminal 301 by priority, when the admission entity 601 denies the subscription to this service, the access entity 502 relays to the terminal 302 the unicast packets originating from the terminal 301 only if the download bitrate on the access interface to the terminal 302 is lower than a maximum bitrate allocated to this interface, advantageously leaving the priority to the packets corresponding to the services which have been accepted by the admission entity 601.

Figure 6:
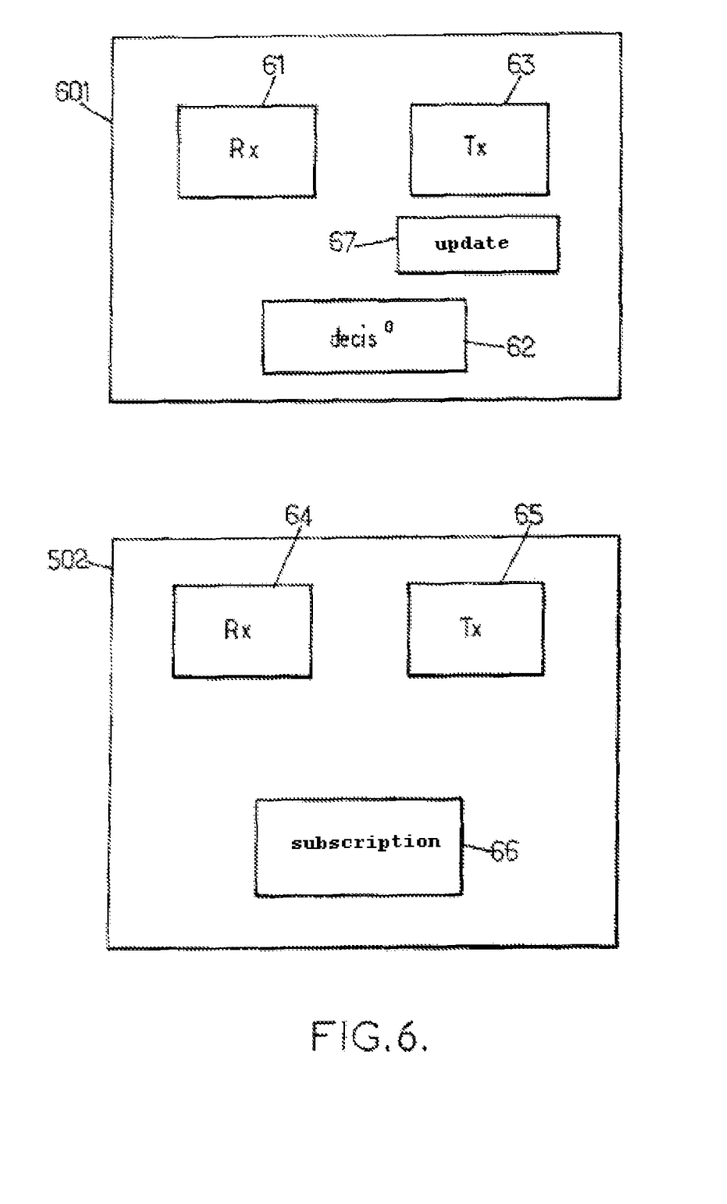
FIG. 6 illustrates an architecture of an admission entity and of an access entity according to one embodiment of the present invention.

FIG. 6 illustrates an architecture of admission entity 601 and of an access entity according to one embodiment of the present invention. The admission entity 601 comprises:

an obtaining unit 60 suitable for obtaining a maximum value of upload bitrate and a value of download bitrate respectively allocated to the first and second terminals;

a reception unit 61 suitable for receiving an admission request in respect of a subscription of the second terminal to the service offered by the first terminal;

a decision unit 62 suitable for taking a decision regarding admission or denial of subscription of the second terminal on the basis of the maximum value of upload bitrate allocated to the first terminal and of the value of download bitrate allocated to the second terminal; and a transmission unit 63 suitable for emitting a response indicating the decision.

In one embodiment, at least one other service being offered in the network by at least one other terminal 303 to which a maximum value of upload bitrate is allocated, the second terminal is already subscribed to said other service; the maximum value of upload bitrate allocated to said other terminal being stored as service bitrate value associated with the second terminal;

the decision unit 62 taking a decision on the basis furthermore of said service bitrate value;

the admission entity furthermore comprising an update unit 67 suitable for updating the service bitrate value associated with the second terminal by adding thereto the maximum value of upload bitrate allocated to the first terminal if the requested subscription is admitted.

The access entity 502 comprises:

a reception unit 64 suitable for receiving a request for subscription 901 of the second terminal to the service offered by the first terminal;

a transmission unit 65 suitable for transmitting an admission request in respect of a subscription to an admission entity 601 and for transmitting the digital information received to the second terminal if the subscription is admitted by the admission entity; and a subscription unit 66 suitable for requesting the network for reception of the digital information if the latter is not already being received.

This invention may be carried out by implementing the IPv4 protocol such as defined in RFC 791 (for 'Request For Comment') or else the IPv6 protocol whose specification may be found in RFC 2460.

In the case where the IPv4 protocol is used, the protocol for subscription to a multicast IP address may be the IGMP protocol for example in its version V3, defined in RFC 3376.

In the case where the IPv6 protocol is used, the protocol for subscription to a multicast IP address may be the MLD protocol (for 'Multicast Listener Discovery') defined for example in RFC 3810.

The present invention can be applied equally well to fixed networks (the access entities can then be for example DSLAM (for 'Digital Subscriber Line Access'), or MSANs (for 'Multiservice access nodes') entities, and to mobile networks (the access entities can then be for example RNC (for 'Radio Network Controller') entities, or eNodeB (for 'evolved NodeB') entities, or else ePDG (for 'evolved Packet Data Gateway') entities).

The invention claimed is:

1. A method of managing subscription to a service offered in a communication network by a first terminal; said communication network comprising a second terminal and said service comprising a transmission of digital information; wherein an admission controller previously obtains a maximum value of an upload bitrate and a value of a download bitrate respectively allocated to the first and second terminals; said method comprising the following steps at a level of the admission controller of the network:

/1/ receiving an admission request in respect of a subscription of the second terminal to the service offered by the first terminal;

/2/ taking a decision regarding admission or denial of subscription of the second terminal on a basis of the maximum value of the upload bitrate allocated to the first terminal and of the value of the download bitrate allocated to the second terminal; and /3/ emitting a response indicating said decision; wherein:

at least one other service being offered in the network by at least one other terminal to which a maximum value of the upload bitrate is allocated, the second terminal is already subscribed to said other service;

the maximum value of the upload bitrate allocated to said other terminal is stored as a service bitrate value associated with the second terminal; and step /2/ is further performed on a basis of said service bitrate value; and, if the requested subscription is admitted, the maximum value of the upload bitrate allocated to the first terminal is added to the service bitrate value associated with the second terminal.

2. The method of managing subscription as claimed in claim 1, further comprising the following steps:

/a/ receiving an information item relating to an unsubscription of the second terminal from the service offered by the first terminal;

/b/ updating the service bitrate value associated with the second terminal by subtracting the maximum value of the upload bitrate allocated to the first terminal;

/c/ acknowledging receipt of this information item relating to the unsubscription.

3. The method of managing subscription as claimed in claim 1, wherein, when the maximum value of the upload bitrate allocated to the first terminal is increased, steps /2/ and /3/ are performed again.

4. The method of managing subscription as claimed in claim 1, wherein, when the value of the download bitrate allocated to the second terminal is reduced, steps /2/ and /3/ are performed again.

5. The method of managing subscription as claimed in claim 1, wherein a first individual send address and a second multibroadcast address being allocated to the first terminal, and a third individual send address being allocated to the second terminal; wherein the maximum value of the upload bitrate allocated to the first terminal is stored in association with the first individual send address and the value of the download bitrate allocated to the second terminal is stored in association with the third individual send address; and wherein said admission request indicates the first address relating to the first terminal and the third address relating to the second terminal.

6. The method of managing subscription as claimed in claim 1, the second terminal having access to said network via an access manager;

said method comprising the following steps at the level of said access manager:

/i/ receiving a request for subscription of the second terminal to the service offered by the first terminal;

/ii/ transmitting an admission request in respect of said subscription to an admission controller; and /iii/ on receipt of a response indicating the admission of the second terminal to the service, transmitting the digital information received to the second terminal;

in which in step /ii/, if the digital information are not already received, the following steps are performed:

emitting a request for subscription to the service destined for the network; and receiving the digital information.

7. The method of managing subscription as claimed in claim 6, further comprising the following steps:

receiving a request for unsubscription of the second terminal from the service offered by the first terminal; transmitting an information item relating to said unsubscription to the admission controller; and halting the transmission of the digital information destined for the second terminal; wherein, when the second terminal is the last terminal subscribed to the service for the access manager, said access manager transmits the request for unsubscription to the network.

8. A non-transitory computer program medium comprising instructions for the implementation of the method as claimed in claim 1, when this program is executed by a processor.

9. An admission controller that manages a subscription to a service offered in a communication network by a first terminal:

wherein:

said communication network comprising a second terminal;

said service comprising a transmission of digital information;

said admission controller comprising:

an obtaining unit that obtains a maximum value of an upload bitrate and a value of a download bitrate respectively allocated to the first terminal and to the second terminal;

a reception unit that receives an admission request in respect of a subscription of the second terminal to the service offered by the first terminal;

a decision unit that takes a decision regarding admission or denial of subscription of the second terminal on a basis of the maximum value of the upload bitrate allocated to the first terminal and of the value of the download bitrate allocated to the second terminal; and a transmission unit that emits a response indicating said decision;

wherein:

at least one other service being offered in the network by at least one other terminal to which a maximum value of the upload bitrate is allocated, the second terminal is already subscribed to said other service;

a memory stores the maximum value of the upload bitrate allocated to said other terminal as a service bitrate value associated with the second terminal; and the decision unit performs on a basis of said service bitrate value; and, if the requested subscription is admitted, the maximum value of the upload bitrate allocated to the first terminal is added to the service bitrate value associated with the second terminal.

10. The admission controller as claimed in claim 9, wherein, at least one other service being offered in the network by at least one other terminal to which is allocated a maximum value of the upload bitrate, the second terminal being already subscribed to said other service;

the maximum value of the upload bitrate allocated to said other terminal being stored as service bitrate value associated with the second terminal;

the decision unit that takes a decision on a further basis of said service bitrate value; the admission controller further comprising an update unit that updates the service bitrate value associated with the second terminal by adding thereto the maximum value of the upload bitrate allocated to the first terminal if the requested subscription is admitted.

11. A system that manages a subscription to a service offered in a communication network by a first terminal:

wherein:

said communication network comprises a second terminal;

said service comprises a transmission of digital information; and said system comprises an admission controller as claimed in claim 9 and an access manager comprising:

a reception unit that receives a request for subscription of the second terminal to the service offered by the first terminal;

a transmission unit that transmits an admission request in respect of a subscription to an admission controller and for transmitting the digital information received to the second terminal if the subscription is admitted by the admission controller; and a subscription unit that requests the network for reception of the digital information if the latter is not already received;

wherein:

at least one other service being offered in the network by at least one other terminal to which a maximum value of the upload bitrate is allocated, the second terminal is already subscribed to said other service;

a memory stores the maximum value of the upload bitrate allocated to said other terminal as a service bitrate value associated with the second terminal; and the decision unit performs on a basis of said service bitrate value; and, if the requested subscription is admitted, the maximum value of the upload bitrate allocated to the first terminal is added to the service bitrate value associated with the second terminal.

12. The system for managing subscription as claimed in claim 11, wherein the access manager limits the upload bitrate of the first terminal short of the maximum value of the upload bitrate which is allocated to it.

* * * * *